United States Patent

[11] 3,584,673

| [72] | Inventor | Walther Ernst Fritz Lehmann<br>Costa Mesa, Calif. |
|---|---|---|
| [21] | Appl. No. | 759,638 |
| [22] | Filed | Sept. 13, 1968 |
| [45] | Patented | June 15, 1971 |
| [73] | Assignee | AMF Incorporated |

[54] METHOD AND APPARATUS FOR DETREADING TIRES
17 Claims, 12 Drawing Figs.

[52] U.S. Cl............................................. 157/13
[51] Int. Cl............................................. B29h 21/08
[50] Field of Search.................................. 157/13

[56] References Cited
UNITED STATES PATENTS
| 1,945,883 | 2/1934 | Connelly | 157/13 |
| 2,864,445 | 12/1958 | Hawkinson | 157/13 |
| 2,945,534 | 7/1960 | Hawkinson | 157/13 |
| 2,965,162 | 12/1960 | Hawkinson | 157/13 |

*Primary Examiner*—Granville Y. Custer, Jr.
*Attorneys*—George W. Price and Thomas M. Hammond ABSTRACT: This invention relates to a method and apparatus for sizing and modifying the circumferential surface of a tirelike object by removal of at least part of the surface material. The invention is particularly applicable to a method and apparatus for sizing and modifying the variable circumferential surface of a tire in a substantially completely automated manner to remove tread rubber therefrom. The method is accomplished by the apparatus in a series of programmed sequential steps in response to initiation by an operator.

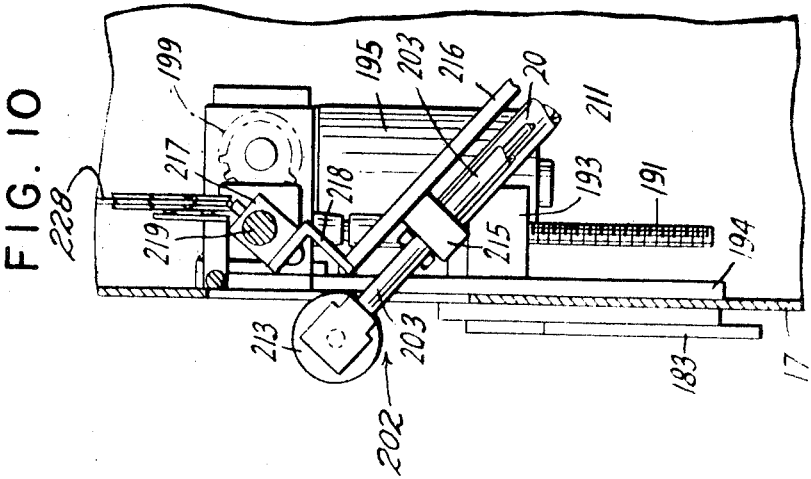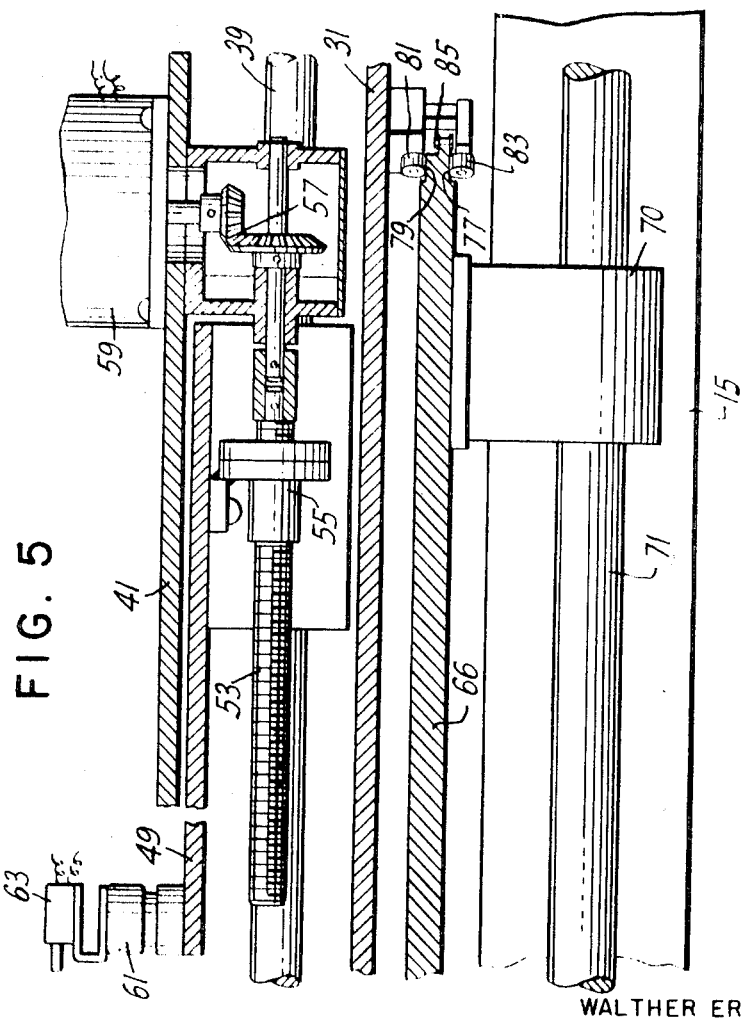

INVENTOR.
WALTHER ERNST FRITZ LEHMANN

ATTORNEY

METHOD AND APPARATUS FOR DETREADING TIRES

This invention relates to a method and apparatus for sizing and modifying the circumferential surface of a circular object by removal of at least part of the surface material. More particularly, the invention relates to a method and apparatus for sizing and modifying the variable circumferential surface of a tire in a substantially completely automated manner to remove the tread rubber therefrom, the method being accomplished by the apparatus in a series of programmed sequential steps in response to initiation by an operator.

Although the method and apparatus of this invention are particularly useful for removing tread rubber from tires prior to recapping, it is to be understood that the invention is not to be so limited, since it can be employed to modify the surface of any suitable circular tirelike or similarly spherical object.

The method and apparatus of the invention present numerous advantages. For example, in the tire industry where detreading is generally carried out by buffing, the invention substantially eliminates dust, a consequent result in the removal of tread rubber by buffing. Moreover, the invention substantially eliminates heat build up, as well as smoking and hazard of fire. Furthermore, it provides a tire carcass which exhibits good adhesion properties for recapping purposes. In addition, the method and apparatus of the invention provide versatility in operation providing for the formation of an accurate contoured surface on a tire from which tread rubber is removed. In addition, the invention provides a cutting device which may be automatically sharpened. The method and apparatus also require less operating horsepower than the buffing method, and are capable of utilization to remove tread rubber from tires of various sizes.

In order to clearly understand the method and apparatus of the invention, reference is directed to the following description taken in conjunction with the accompanying drawings wherein:

FIG. 5 is a detailed view in elevation taken across line 5-5 of FIG. 2 showing the arrangement of elements for manipulating the azimuth bearing plate supporting the expandable hub, the cam follower and the relationship of the indexing table support thereto and to the main frame;

Figure 1:
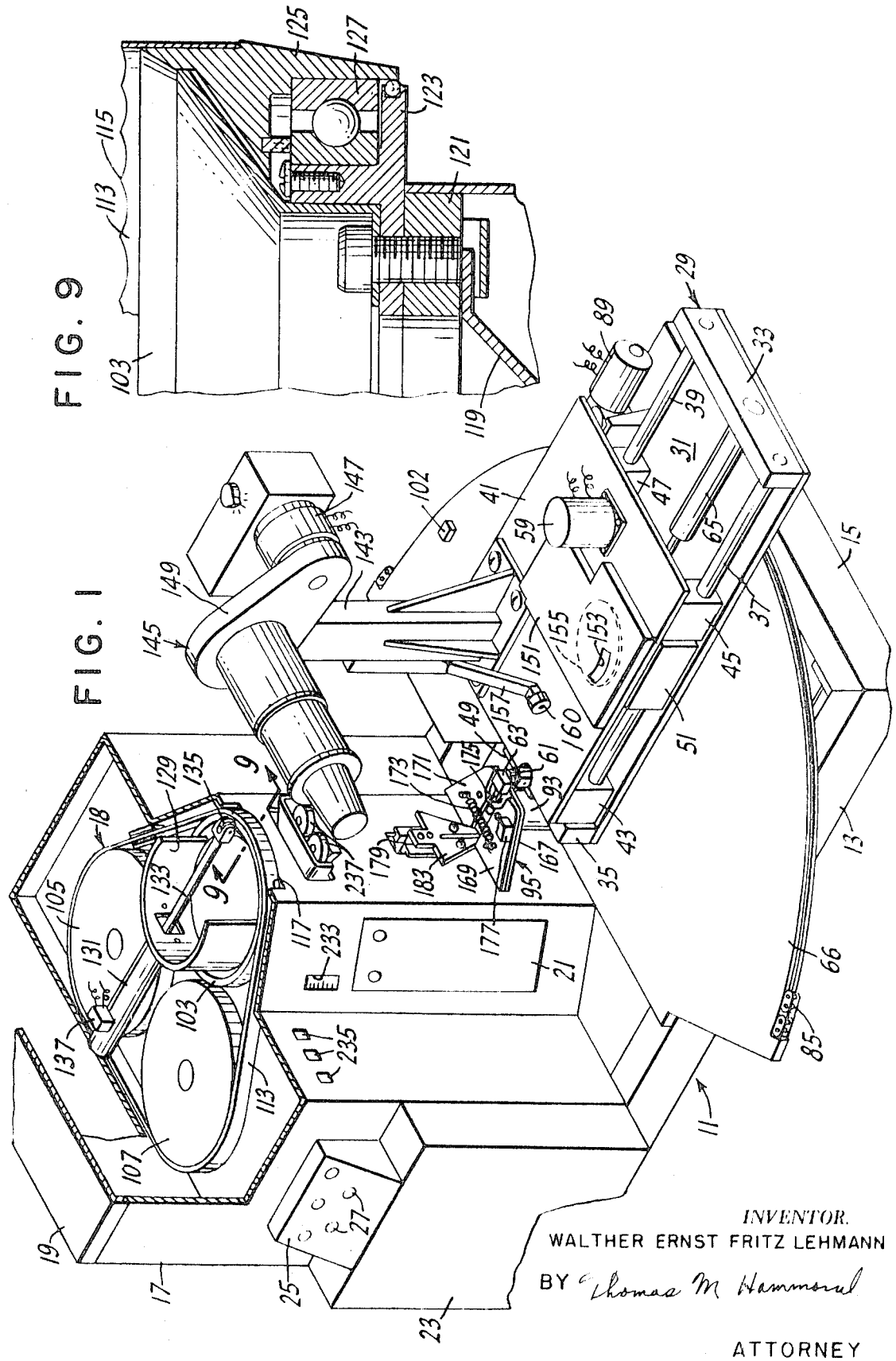
FIG. 1 is a view in isometric of an apparatus according to the invention having the top cover removed to show the general arrangement of the cutting assembly.
Figure 11:
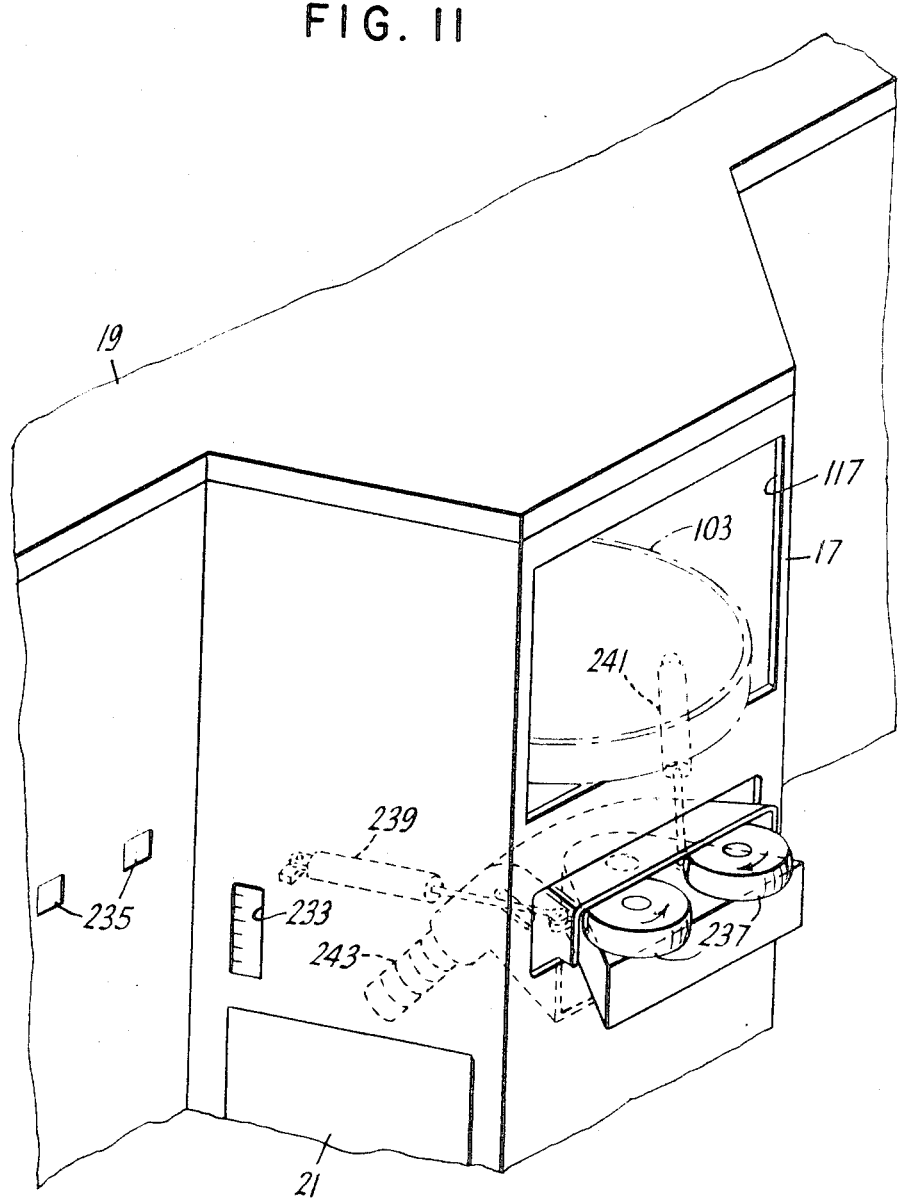

FIG. 9 is a detailed view taken across line 9-9 of FIG. 1 partially showing the blade support structure and take-away chute; and FIG. 10 is a view in elevation taken from the rear and partially showing the arrangement of the width sensing mechanism and the pivot nut on the screw thereof; and FIG. 11 is a partial view in detail showing the relationship of a tire dressing mechanism to the housing and cutting means of an apparatus according to the invention.

In general, apparatus according to the invention comprises cutting means supported on a frame, an indexing table including mounting means for a tire that is to be sized and detreaded supported on the frame in a position so that the tire can be maneuvered for sizing and cutting in relation to the cutting means, a support plate for supporting the indexing table and a template mounted on the support plate. The support plate for the indexing table and the template cooperate with each other and with sensors through a series of switches programmed to open and close in sequential steps through a suitable circuit and to size and detread a tire as explained more fully hereinafter.

Referring more specifically to FIG. 1, the apparatus comprises a supporting frame 11 comprised of side, front, and rear members or shirts of which front member 13 and side member 15 are visible. A housing 17 permanently fixed to and supported by the side, front and rear members also forms part of the frame. The housing encloses a cutting means assembly generally referred to as 18 and other mechanism as more fully explained hereinafter. Access to the housing is provided by a top door 19, partially shown in open position in FIG. 1. Another door 21 on the housing allows access to other mechanisms located therein. Fixed to the housing is an electrical control box 23 containing suitable circuitry and an electrical control panel 25 having a number of control buttons 27 disposed thereon.

The indexing table generally referred to as 29 may be conveniently made of a number of individual members or of a number of suitably cast members and includes a lower rectangular plate member 31 and end members 33 and 35 which support parallel slide bars 37 and 39. An azimuth support plate 41 having supports such as 43, 45 and 47 fixed to its bottom peripheral area which are adapted to cooperate with bars 37 and 39 is disposed over lower member 31.

Disposed between the azimuth support plate 41 (see FIG. 5) and the lower rectangular plate member 31 of the indexing table 29 is cam follower plate assembly 49 which has downwardly extending ball bushing housings, such as shown at 51, and which are adapted to slide on the slide bars of the indexing table. The cam follower plate assembly is connected to the azimuth plate by a Saginaw screw 53 and nut 55 driven by a set of bevel gears 57 through motor 59 located on the azimuth plate to provide adjustment to various tire sizes. Disposed at one end of the assembly is the cam follower 61 on which a switch 63 is located. Accordingly, the azimuth plate and cam follower assembly operate simultaneously and follow a contoured path matching the contour of a tire being detreaded. A pneumatic cylinder 65 (see FIG. 3) is supported on the side member of the indexing table and is connected to the cam follower plate assembly 49 to provide a constant force on the cam follower plate assembly and the azimuth plate urging them against a template through the cam follower 61.

Located below the indexing table is the means for moving the indexing table toward and away from and in an arc with respect to the cutting means and comprises the indexing table support 66 which has a semicircular trailing edge and is movable on guides 67 and 68 and 70 fixed to the bottom of support 66 and slidable on parallel guide bars 69 and 71 as more clearly shown in FIG. 3 and FIG. 5, respectively. The guide bars 69 and 71 are supported by skirt 15 and crossmember 73 of the frame. A pneumatic cylinder 75 is supported on the end member 15 of the frame and is connected in a suitable manner to the bottom of the indexing table support and to a source of air, thereby driving the indexing table support toward and away from the housing portion of the frame, when actuated, as well as also providing adjustment for the basic winding radii which vary with the size of the tire to be sized and detreaded.

The indexing table support 66 has machined surfaces 77 and 79, or is grooved along the semicircular edge, on both upper and lower surfaces which cooperate with guides, rollers or other suitable means 81 and 83 fixed to the lower member 31 of the indexing table. In addition, the semicircular trailing edge of the indexing table support is equipped with sprocket chain 85 cooperating with a sprocket 87 driven by a motor 89 timed to operate in programmed sequence and located on the indexing table.

The indexing table support 66 is also equipped with a post 91 which acts as a pivot about which the indexing table 29 swings. Post 91 extends upwardly into a bearing housing 93 located on the lower member of the indexing table and which bearing housing is suitably equipped on its upper surface to support a template 95. In addition to acting as a pivot for the indexing table, post 91 also serves as a winding radius pivot, being adjustable along with indexing table support means 66 through pneumatic cylinder 75. The basic winding radius is defined as the distance between the center of rotation of the apparatus, post 91, and the cutting edge of the cutting assembly 18.

Figure 2:
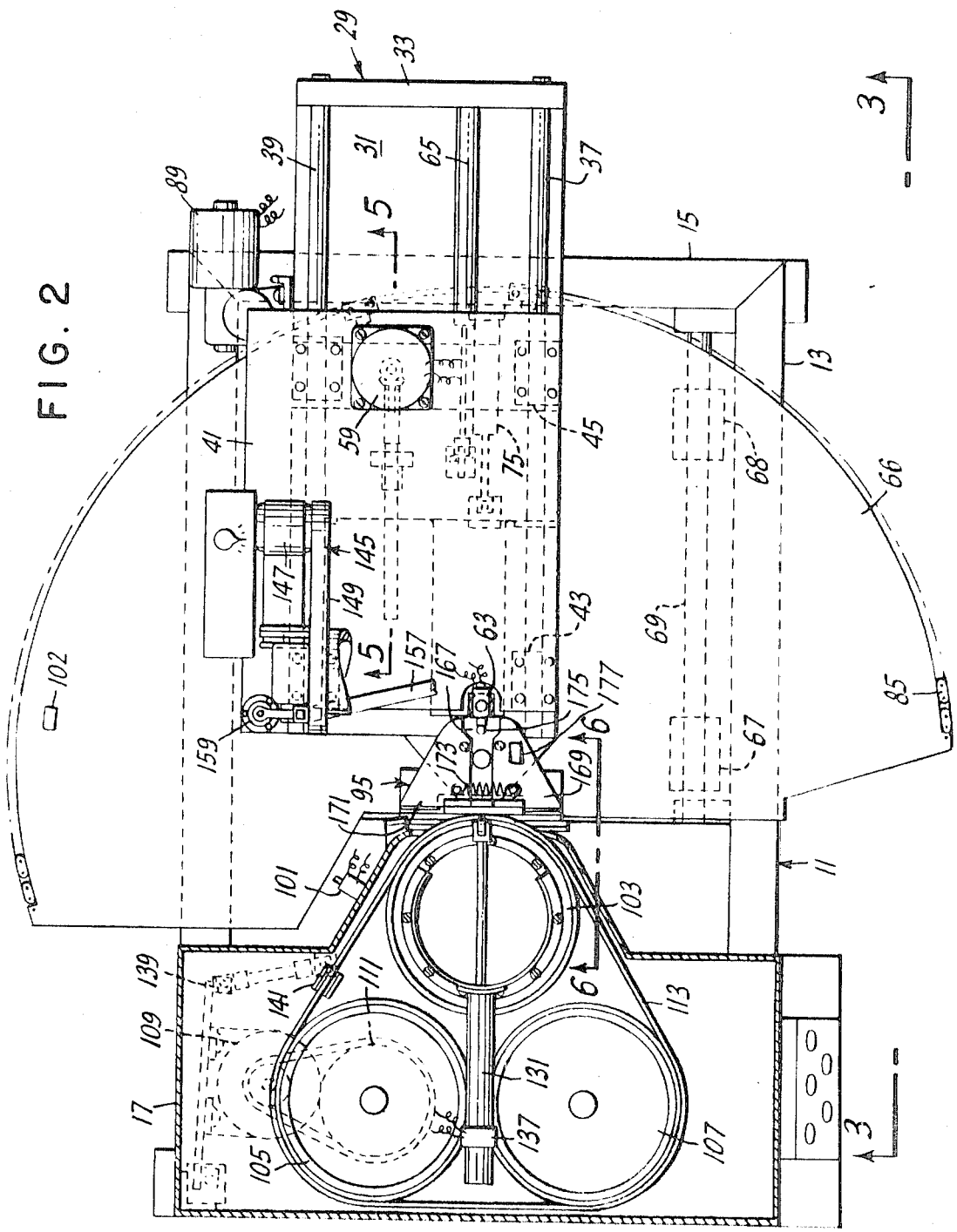
FIG. 2 is a plan view of the apparatus of FIG. 1 with the expandable hub portion cut away and hidden elements of the frame and associated structure, as well as the power source for rotating and cutting blade shown in dotted lines.

A limit switch 101 (FIG. 2) is fixed to the housing and when contacted by the indexing table when it swings to the rear of the apparatus stops its movement. This switch is also equipped with a time delay means to permit an operator to decide whether a further cut is needed and if so, to actuate a "By-Pass" button on the panel 25.

The cutting means assembly 18 and associated mechanism is located and supported in a convenient manner by housing portion 17 of the frame 11 and includes cup member generally designated by 103, driving wheel 105 and idler wheel 107. Wheel 105 is driven by motor 109 through belt drive 111. A band knife 113 having scalloped cutting edges 115 as shown in FIG. 9, is disposed around cup member 103 and wheels 107 and 109 with the cutting surface exposed through opening 117 in the housing. Cup member 103 is open at the bottom and forms a waste chute 119 and is removably fixed to the base member as shown in 121 so that it is interchangeable. It will be noted that cut member 103 is comprised of a stationary member 123 around which rotatable knife supporting member 125 rotates on bearing race 127. In addition, a deflector screen 129 is supported on the stationary member 123. A pneumatic cylinder 131 is suitably supported on the housing over the cutting means, the piston rod 133 of the cylinder projecting through an opening in the deflection screen and being equipped with a sensing roller 135 and a cooperating upper sizing switch 137 connected to suitable circuiting for sequential operation and for purposes more fully explained hereinafter. Also located in the housing is suitable bracket 139 supporting a wiper 141. This element is optional and also as optional elements there may be included suitable means for sharpening the blade as well as for adjusting the blade on the cutting assembly, neither of which are shown, such constructions generally being obvious to those skilled in the art.

Returning now to the azimuth support plate 41 there is located thereon azimuth bracket 143 which supports an expandable hub or wheel assembly, generally designated by numeral 145.

The expandable hub or wheel assembly may vary in construction but preferably is one such that shown in U.S. Pat. No. 3,291,171 to Lehmann or U.S. Pat. No. 2,960,130 to Smyser or other suitable construction suitable for supporting a tire for either a hand operated manipulation or automatic manipulation for inflating or deflating. Preferably, however, the expandable hub or wheel assembly is that construction disclosed in the Lehmann patent referred to above and includes a variable speed motor assembly 147 driving sprockets and chains (not shown) enclosed in a housing 149 and adapted to turn the hub and thereby rotate a tire disposed thereon. The azimuth bracket illustrated is stationary. It is to be understood, however, that it can be designed to be retractable, moving toward or away from the cutting means. There is also connected to the expandable hub pneumatic lines connected to a source of air and adapted to operate in an automatic sequence including proper connection to a programmed sequential circuit.

Figure 3:
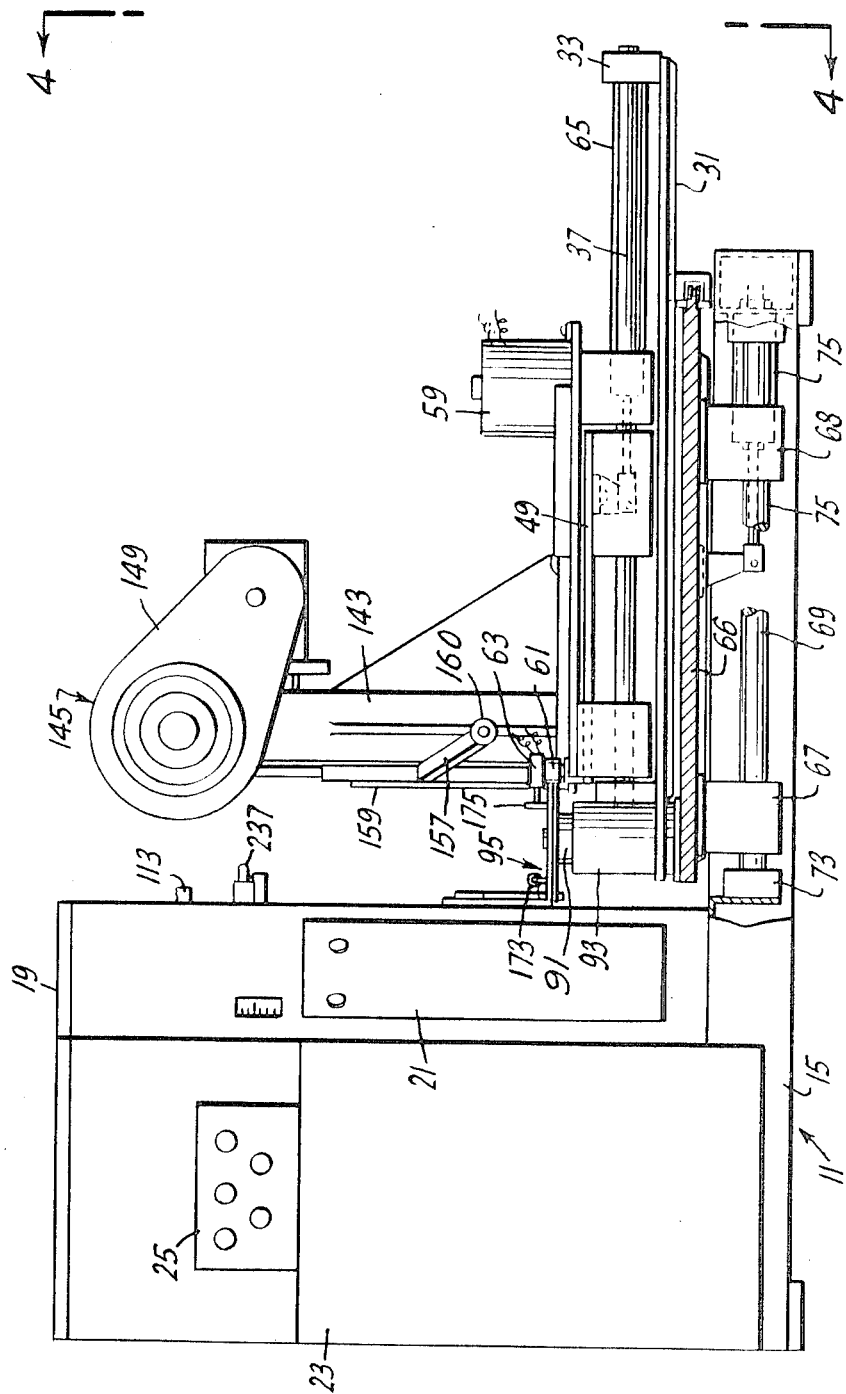
FIG. 3 is a view in elevation taken across line 3-3 of FIG. 2.

There is also located on azimuth support plate 41 a cover 151 containing a window 153 through which is visible a graduated diameter readout scale 155 connected to a cable (not shown) which at the opposite end is attached to diameter measuring arm 157 connected to pneumatic cylinder 159 located on the azimuth bracket as shown in FIG. 3. A roller assembly 160 is mounted at the end of measuring arm 157 and is adapted to ride on a tire mounted on hub assembly 145. The pneumatic cylinder 159 may be optionally operable merely by being biased in a raised position and to change when a tire is in position on the hub or wired into the sequential programmed circuit and operable through a suitable switch to be raised and lowered. The diameter readout scale is adapted to move a given distance for an equal distance that the sensing arm is moved, with a preferable scale ratio of 1:2, that is, when the sensing arm moves one inch on the radius, the scale will read a two inch movement for the diameter differential, properly calibrated to give an exact tire diameter reading.

Referring now more particularly to the template 95, it is composed of a baseplate 167 having rotatably attached to the upper surface parallel wings 169 and 171 which are biased toward each other by spring 173. A pin 175 is located on the base member to trip the switch located on top of the cam follower as the indexing table moves inwardly toward the template bringing the cam follower into contact with the template.

Located on wing 169 is actuator 177, the purpose of which is explained more fully hereinafter.

Figure 4:
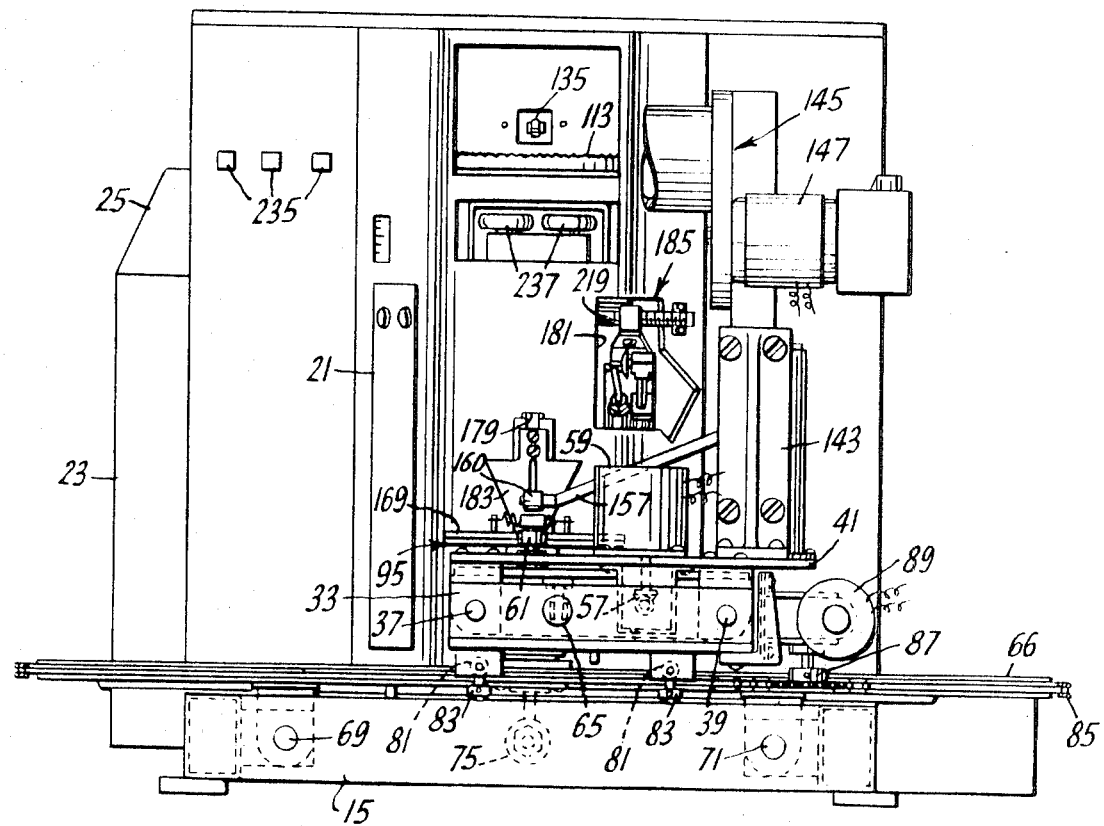
FIG. 4 is a lateral view in elevation of the apparatus taken along line 4-4 of FIG. 3 with the expandable hub removed.

Referring now more particularly to FIGS. 4, 6, 7, 8 and 10, there is shown in detail the mechanism for determining the width and contour sizing and setting means including the width sensing mechanism associated therewith. More specifically, housing 17 has openings 179 and 181 located therein as shown in FIG. 4. Located outside opening 179 is wedge 183, the point of which projects downwardly between the wings of the template when the template is in place and the indexing table support is in a position nearest the housing. Extendable and retractable through opening 181 is the width sensing means or arm and associated mechanism 185. Both wedge 183 and sensing arm 185 are operable through a common driving means generally designated by 187 and attached internally of the housing wall as shown generally in FIG. 7.

Referring more specifically to FIGS. 6, 6A, 7 and 10, the driving means for the wedge and sensing arm comprises a bevel gear box 189 having a downwardly extending Saginaw screw 191 equipped with a slide block 193. The slide block rides against a backup plate 194 and is connected in convenient manner to the wedge 183 so that the wedge can be raised or lowered by driving motor 195 through gears 194 and 199 upon initiation by a switch (not shown) which is wired into a suitable sequentially programmed circuit for operation of the apparatus of this invention.

Figure 6:
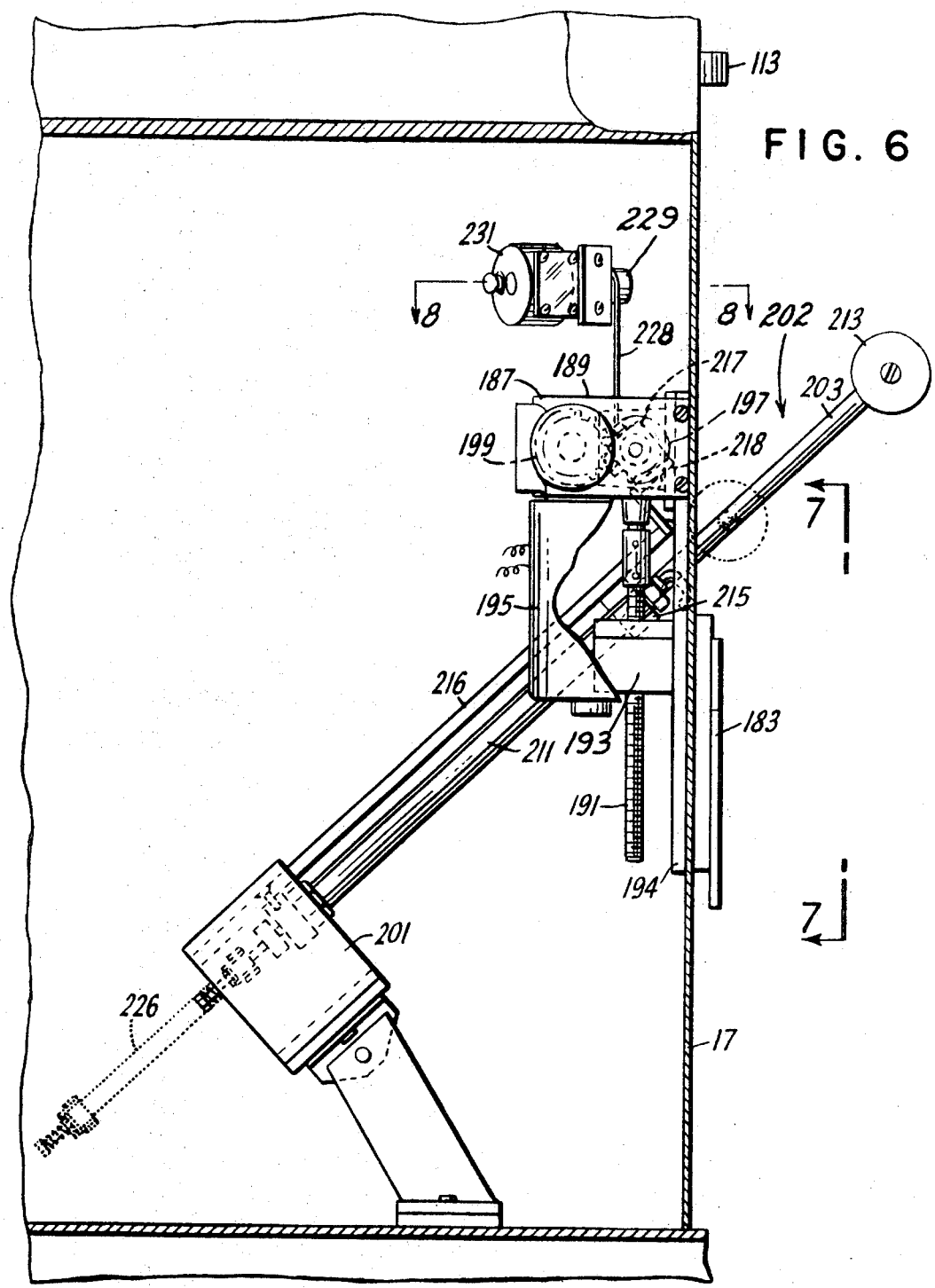
FIG. 6 is a partial front view in elevation taken along line 6-6 of FIG. 2 and showing the width sensing means and button sensor in detail.
Figure 6A:
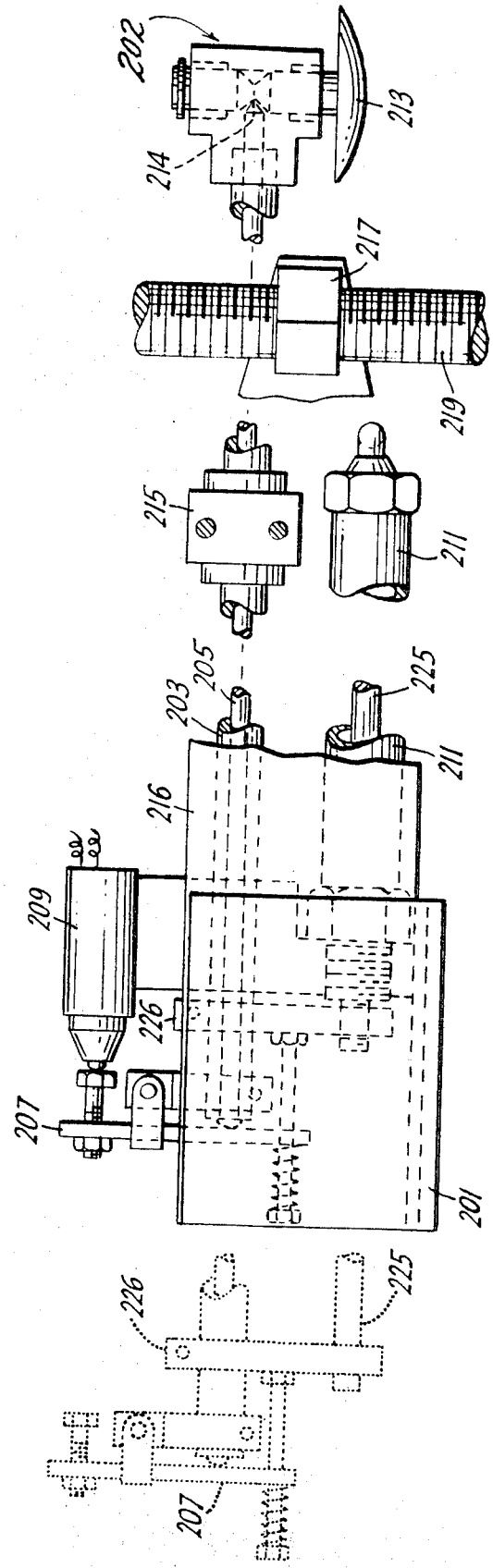
FIG. 6A is a partial plan view in detail of the width sensing means.
Figure 8:
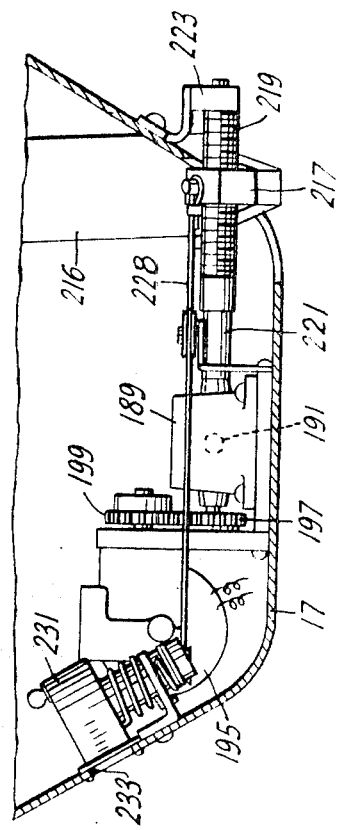
FIG. 8 is a detailed plan view taken in cross section along lines 8-8 of FIG. 6 showing the width readout control mechanism.
Figure 7:
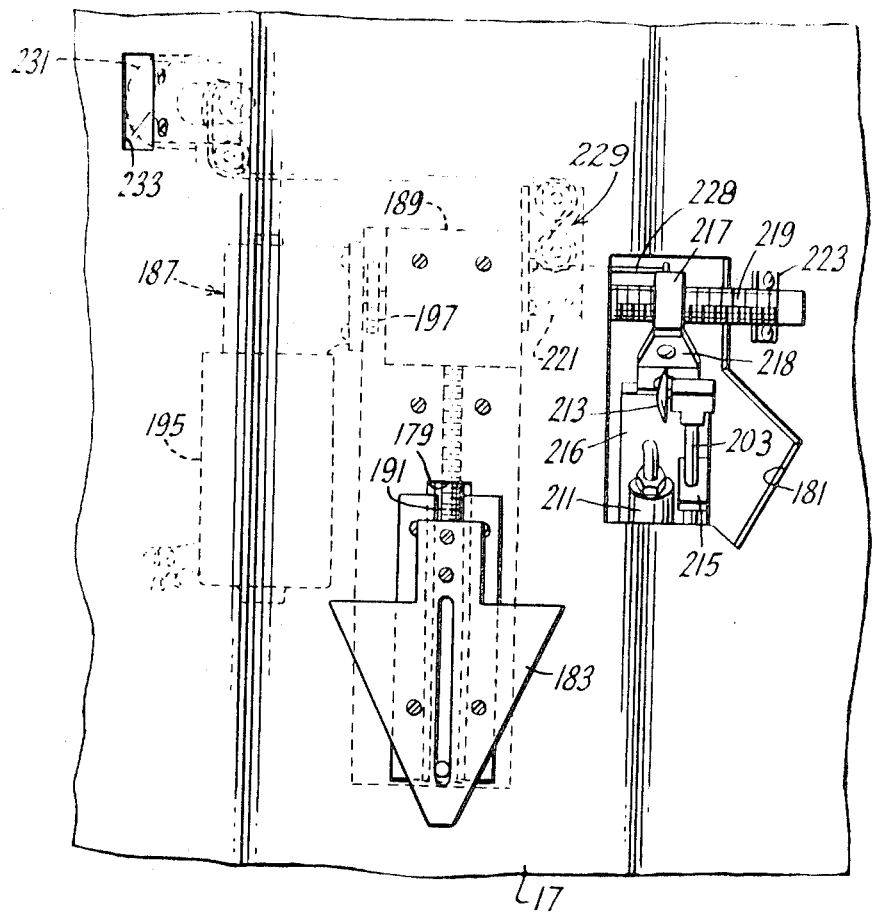
FIG. 7 is a lateral view in elevation taken along line 7-7 of FIG. 6 showing in detail the template control plate on wedge and its relationship to the width sensing means and the screw of the width sensing means in detail.

The width sensing means and associated mechanism 185 generally comprises a bracket 201 attached to the frame and which is capable of pivoting on a linkage, as shown in FIG. 6. Attached to the bracket is a sensing arm 202 including a sensor rod guide 203 containing a sensor push rod 205 which is adapted to cooperate with an actuator 207 to close a micro switch 209. Also supported on the bracket 201 is air cylinder 211 whose piston and rod move inwardly as the sensing arm 202 moves into extended position. The sensor push rod extends outwardly and a sensing button 213 having a cammed surface 214 is fixed to its end. The sensor push rod passes through a bearing housing 215 attached to the elongated extended portion 216 of bracket 201 which in turn is suitably connected with pivot nut 217 as shown by 218; pivot nut 217 is threaded to acme screw shaft 219 or other suitable means that extend laterally from the gear box mentioned above and linked to the bevel gear system through a coupling 221.

The screw is anchored at its other end in a convenient manner to the housing of the frame by 223. The sensing rod 205, when the sensing arm 202 moves laterally and the button comes into contact with the sidewall of a tire, is depressed on cammed surface 214 and contacts actuator 207 to close the switch 209 and stop motor 195. The sensing rod guide 203 and piston rod 225 of the cylinder are connected for joint movement by tie bar 226.

At the same time the sensing arm 202 is extending and moving laterally, the motor driving the bevel gears causes the pivot nut to move laterally on the acme screw. The pivot nut is connected by a wire 228 through a pulley 229 with a spring-biased readout mechanism 231 and graduated to properly indicate the width of a tire being sized. The readout scale is visible through a window 233 in the housing.

The wedge 183 also has associated therewith two limit switches (not shown) which restrict the distance through which it can move vertically. The Saginaw screw 191 which drives the wedge 193 turns in a direction opposite from the acme screw 219 which drives the sensing arm laterally.

Located on the frame housing are a plurality of buttons 235 connected into the programmed sequential circuit and then to the sizing motor on the indexing table. These buttons are pressed when the operator decides the depth of cut he wishes to make on a tire to be detreaded and are generally calibrated to initiate driving of the motor and move the indexing table a given distance, such as one thirty-second inch, one-sixteenth inch and one-eighth inch or multiples of these.

In FIG. 11 there is illustrated a tire dressing means which is optional, but preferably, employed in an apparatus of this invention. The tire dressing means is located in an additional opening in the housing 17 of the frame and includes dressing wheels 237 which are driven by a suitable linkage (not shown) connected to the motor of the cutting means or to a separate motor and adapted to oscillate by means of cylinders 239 and 241 which are suitably attached to the frame housing 17 in a convenient manner.

Associated therewith is a waste chute 243 which may be connected to a vacuum source in order to carry off particles which result from dressing of a tire surface. It is to be noted that the tire dressing mechanism is disposed below the cutting means and, therefore, cutting takes place before dressing of the tire surface, the slight dressing merely being employed to improve the surface and result in even better adhesion of tread rubber thereto.

Generally, the apparatus of the invention operates as follows:

After the proper template 95 is installed and with the index table 29 in the center position, the corresponding tire is mounted on the hub assembly 145. The actuation of an inflate button will energize a solenoid valve which opens the flow of compressed air to the hub piston and causes hub expansion. After completion of this expansion and sealing of the beads of the mounted tire, the pressure build up will open a relief valve which then in turn will allow air flow to the inflate line to provide the tire with proper internal pressure and seat the beads of the casing against the rim edges. Simultaneously, pneumatic cylinder 159 is biasing roller assembly 160 against the outside diameter of the inflated tire. The roller assembly 160 is interlocked by a cable arrangement with a readout drum, indicating the actual diameter of the tire.

A properly programmed, sequential circuit is wired into and connected with the proper elements to carry out the operation in the desired steps.

After inflation of the tire, the operator pushes a "Casing Forward" button on the control panel. This actuates cylinder 75 to advance the tire and its supporting means towards the cutting device until the cam follower engages the template and the lower sizing switch (above the cam follower) is closed by pin 175 to start the sizing motor 59, which then moves the tire and its supporting means further towards the cutting device 18, cylinder 75 remaining in position.

Simultaneously with the first portion of the "casing forward" motion, the upper sizing switch cylinder 131 is actuated forward, which moves the sensing roller 135 of the sizing switch 137 in line with the cutting edge and also actuates the cylinder 211 of the tire width sensing device 185 which advances the width measuring switch assembly into position. As the tire, in its second portion of the "casing forward" motion, approaches the cutting mechanism 18, the outside diameter of the tire will actuate the upper sizing switch 137. This instantaneously stops the casing forward motion by stopping motor 59, and starts the tire width sensing.

At the same time, the width sensing mechanism 185, now extended, moves laterally toward the tire, simultaneously raising the wedge 183 until the sensing button 213 touches the tire and the sensor push rod 205 actuates the switch 209, stopping the wedge. This provides a rough winged template setting. As the width sizing is completed, the tire and supporting means is then automatically retracted away from the template 95 and swings to the forward side of the machine, driven by the sprocket 87 of the motor 89 located on the indexing table which meshes with the chain 85 on the indexing table which meshes with the chain 85 on the indexing table support. At this point, the operator decides the depth of cut to be taken and pushes the appropriate button on the housing. If desirable, multiple combinations can be pushed for a total cut. The circuit is properly programmed so that by actuating the buttons to decide depth of cut, the tire and supporting means move a given distance toward the cutting means by actuation of the sizing motor. Next, the tire supporting means moves in to touch the winged template 95 and the template closes the switch 63 located over the cam follower 61. This starts the motor controlling the wedge 183, moving it upwardly until the tire contacts sensing roller 135 of switch 137 mounted above the cutting blade to initiate the template finite adjustment, which compensates for variance in tire manufacturing. When this step is completed the tire is in cutting position and the operator pushes a "Start Cycle" button on the control panel to start the blade motor and the tire rotating motor on the expandable hub assembly. After pushing an indexing button, the indexing table moves along a semicircular path, following the template contour while rubber is cut from the tire. If a tire dressing means 237 is also used, the surface exposed after cutting is subjected to dressing. The scrap rubber falls through the central opening in the cup member 123 and through a deflection chute 119 inside the housing. The tire and the indexing table continue to index to the extreme limit where a limit switch 101 on the frame having a time delay associated therewith stops the indexing motion when it is contacted by the indexing table. At that time, the operator decides whether a recut is necessary.

If so, an "Optional Reverse" cut button is pushed allowing the selection of an additional cut during a reverse cycle to take place. If an additional cut is not necessary, the tire blacks off the blade and returns to the centerline of the apparatus automatically being stopped there by means of a detent 102 which is disposed on the indexing table support means and cooperates with a switch (not shown) attached to the lower part of the indexing table. At the end of the cutting cycle the blade motor is programmed to stop automatically as the indexing table retracts and the tire on the hub automatically deflates as the indexing table moves back to the central position. At this point the detreaded tire is simply removed and the apparatus is ready to receive another.

Accordingly, the apparatus of the invention carries out a method for sizing and detreading a tire which briefly includes mounting and inflating a tire on the tire supporting means, determining the outside diameter of the tire, bringing the circumferential surface of the tire into contact with a cutting means while determining the width of the tire by bringing an extendable and retractable sensing arm into contact with the sidewall of the tire and at the same time adjusting a winged template to provide a basic adjustment of tire size. When that step is completed the tire is then retracted from contact with the cutting means and moved in a semicircular path with respect to the cutting means after which it is brought forward to contact the cutting means at an angle less than 90° from the centerline of the cutting means.

At this point, a finite setting or sizing can be brought about by adjustment of the template after the depth of the cut to be taken is set before moving the indexing table forward to take the finite sizing, after which the indexing table is moved into the cutting means which upon actuation cuts surface rubber from the tire while following the contour of the template until a predetermined limit has been reached. Thereafter, the tire is retracted from the cutting means and returned to the centerline of the apparatus while simultaneously deflating the tire and releasing it from the tire supporting means.

In geometric terms, the method comprises spinning a tire around its rotational axis and cutting tread rubber therefrom with the aid of a continuous knife while moving the cutting edge of the knife in a fixed plane at a greater linear velocity than the peripheral velocity of the tire, making the two velocities perpendicular to each other so that the cutting edge of the knife moves in a transverse direction with respect to the outer periphery of the tire as the tire rotates around a rotational axis and around an azimuth axis perpendicular to its rotational axis. Sequentially and simultaneously while the above steps take place there is in progression a change in the position of the tire with respect to the azimuth axis and with respect to the fixed plane of the knife and during which progression the position of the tire is progressively moving along a fixed predetermined azimuth locus determined by a template which corresponds to the size of the tire. Accordingly, the steps bring about the cutting of a continuous variable thickness of elastomeric ribbon or other material or fractions thereof from the outer layer of rubber on the tire, the cutting beginning along one side of the tire and then progressing across the crown and terminating along the other side as the tire is rotated around the azimuth axis after which the tire is returned to the center line of the machine while automatically deflating.

As mentioned hereinabove, an advantage of the present invention resides in the provision of an apparatus which operates on relatively small horsepower requirements. For example, the apparatus of this invention requires a total of about 5 horsepower or slightly in excess thereof. The small amount of horsepower required is due to the construction of the apparatus and the manner in which it carries out the detreading of a tire since relatively large frictional forces are not inherent in the construction. In contrast to the present apparatus tire buffing devices generally require from 20—30 horsepower motors. In addition, the speed of the cutting blade and the rotational speed of the tire can be widely varied in a simple manner in accordance with the particular needs of operation.

Various modifications of the method and apparatus of this invention may be made without departing from the spirit and scope thereof. Accordingly, the invention is not to be limited to any particular embodiment except as defined in the appended claims.

What I claim is:

1. Apparatus for sizing and removing material from the circumferential surface of a circular object comprising a frame, cutting means supported on said frame, an indexing table supported on said frame in spaced relationship with said cutting means, means mounted on said indexing table for mounting the object to be sized and cut, means for moving the indexing table toward and away from and in an arc with respect to said cutting means, a template for providing a contoured arcuate path of travel for said indexing table and means mounted on said frame for slidable movement with respect to said template for adjusting the contoured path of travel provided thereby for said indexing table.

2. Apparatus as defined in claim 1 wherein the cutting means is an endless rotatable knife.

3. Apparatus for sizing and removing material from the circumferential surface of a circular object comprising a frame, cutting means supported on said frame, an indexing table mounted on the frame opposite the cutting means, means mounted on the indexing table for supporting the circular object being sized and cut, means for moving said indexing table toward and away from and in an arc with respect to said cutting means, a template for defining the arcuate path followed by said indexing table, sensing means including a projectable and retractable arm and a downwardly projecting plate mounted on said frame in proximity to said adjustable template, said arm being mounted for lateral movement to contact the side of the object to be sized and said plate being mounted for vertical movement simultaneously with the movement of said arm to engage the template and adjust the arcuate path provided thereby in accordance with the width sensed by said arm.

4. Apparatus for sizing and removing material from the circumferential surface of a tire comprising a frame, an endless rotatable knife supported on said frame, an indexing table including a cam follower with a switch located thereon supported on said frame in spaced relationship with said endless rotatable knife, a hub mounted on said indexing table to support the tire to be sized and cut, pneumatic means for moving the indexing table toward and away from said endless rotatable knife, a motor including a driven sprocket mounted on said indexing table for moving said indexing table in an arc with respect to said endless rotatable knife, indexing table support means having an arcuate trailing edge located on said frame below said indexing table and including a sprocket chain disposed along the arcuate trailing edge which cooperates with said driven sprocket to guide said indexing table in an arc with respect to said cutting means, an adjustable winged template, mounted on said indexing table support means and extending upwardly above said indexing table, a first pneumatically projectable and retractable sensor including a switch located above said endless rotatable knife, a second sensor including a projectable and retractable arm and a vertically movable downwardly projecting plate located on said frame in contact with said winged template, and including a switch and driving means to actuate said arm and said plate and switches to limit the vertical movement of said plate, said arm being adapted to lateral adjustment to come into contact with a sidewall of the tire to be sized and cut and said plate being adapted for upward vertical movement simultaneously with the lateral adjustment of said arm to determine generally the size of the object to be sized and cut, motor driven screw means located on said indexing table adapted to move said indexing table through a given distance in proximity with said endless rotatable knife to determine the depth of the cut on the object to be sized and cut, driving means associated with said plate to drive said plate upwardly independently of movement of said arm and to allow the wings of said template to be adjusted inwardly when said cam follower is in contact with said template to determine the finite size of said object to be sized and cut, said template providing a contoured path of travel for said indexing table that is patterned on the tire width after sizing is completed.

5. The apparatus as defined in claim 4 including a tire dressing means mounted in the frame housing below said endless rotatable knife and above said template.

6. The apparatus as defined in claim 4 wherein said indexing table support means includes pneumatic means to move said support means towards and away from the downwardly projecting plate.

7. The apparatus as defined in claim 4 wherein said indexing table includes a bearing housing cooperating with a post disposed on the indexing table support means to provide a pivoting point for said indexing table with respect to said support means.

8. The apparatus as defined in claim 4 including motor means located on said frame for driving the endless rotatable knife.

9. The apparatus in claim 4 including motor means to rotate said hub.

10. A method for sizing and cutting material from the circumferential surface of a tire comprising mounting and inflating a tire on a tire supporting means, determining the outside diameter of the tire, determining the width of the tire by bringing an extending and traversing arm into contact with the sidewall of the tire while simultaneously adjusting a variable contour template to provide a basic adjustment of the tire size, traversing the tire in a semicircular path with respect to said cutting means, bring the tire forward at an angle less than 90° from the center line of said cutting means while simultaneously adjusting the template for a finite setting and subsequently retracting the tire, adjusting the relationship of the tire to the cutting means and determining the depth of cut, moving the tire into the cutting means, rotating the tire and cutting surface rubber from said tire while traversing and following the contour of the template until reaching a predetermined limit, and retracting said tire from said cutting means and traversing said tire to the centerline of said cutting means while simultaneously deflating the tire to release it from said tire supporting means.

11. The method as defined in claim 10 wherein the depth of the cut is determined before adjusting the template for the finite setting.

12. A method of detreading a tire with the aid of a continuous knife including the steps of:
  a. spinning said tire around its rotational axis,
  b. moving the cutting portion of said knife in a single fixed plane at a greater linear velocity than the peripheral velocity of said tire,
  c. making said two velocities perpendicular to each other whereby the cutting edge of said knife moves in a transverse direction with respect to the axis of rotation of said tire,
  d. rotating said tire around an azimuth axis perpendicular to said rotational axis, and
  e. simultaneously changing the position of said tire with respect to said azimuth axis and with respect to said fixed plane and said knife along a fixed, predetermined azimuth locus corresponding to the size of said tire.

13. The method as defined in claim 12 wherein the cutting portion of the knife is moved in a cylindrical fixed plane.

14. The method as defined in claim 12 wherein the surface of the tire is continuously dressed after cutting by a dressing means lying in a plane perpendicular to the axis of rotation of the tire.

15. The method as defined in claim 12, which also includes the additional steps of automatically inflating said tire to a predetermined pressure upon mounting of said tire on said rotational axis and simultaneously measuring the actual outer diameter of said tire, automatically positioning said tire with respect to said azimuth axis as a function of said actual diameter of said tire and the size of said tire, and altering said position prior to the beginning of said detreading for fixing the degree of detreading desired on any given tire.

16. The method as defined in claim 15, which also includes the additional steps of automatically starting and stopping said detreading at predetermined first and second azimuth positions of said tire respectively, automatically stopping the rotation of said tire around said rotational axis after reaching said second azimuth position and also automatically deflating said tire, and thereafter automatically returning said rotational axis to its first azimuth position for restarting said process with another tire.

17. A method of detreading a tire including the steps of rotating said tire around its first, normal axis of rotation, simultaneously rotating said tire around a second azimuth axis perpendicular to said first axis and lying in a first plane passing through a midportion of the circumference of said tire and bisecting said tire, said second axis normally passing substantially through the geometric center of a transverse bead-to-bead cross section of said tire produced by a second plane passing through said first axis and being normal to said azimuth axis and also passing through a line defining the position of a continuous cutting edge, whereby said cutting edge forms a substantially tangential contact with the outer surface of said tire, continuously moving said cutting edge along said line and in a substantially perpendicular direction to said azimuth axis and also in said second plane, whereby said edge continuously travels in a transverse direction to the outer circumferential surface of said tire, and varying the position of said tire with respect to said azimuth axis in a predetermined manner, and along a fixed locus, as said tire is rotated around said azimuth axis whereby the rotation of said tire around said first and azimuth axes, displacement of said tire with respect to said azimuth axis and the continuous transverse movement of said cutting edge cuts a continuous variable thickness ribbon from the outer elastomeric layer of said tire, said cutting progressing from one side, across the crown, and to the other side of said tire as said tire is rotated around said azimuth axis.